United States Patent
Mendoza et al.

(10) Patent No.: US 6,239,320 B1
(45) Date of Patent: May 29, 2001

(54) THERMAL FLUID BLENDS CONTAINING 1,2,3,4-TETRAHYDRO(1-PHENYLETHYL) NAPHTHALENE

(75) Inventors: Abel Mendoza; John B. Cuthbert, both of Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/402,734

(22) PCT Filed: Apr. 30, 1998

(86) PCT No.: PCT/US98/08568

§ 371 Date: Jan. 6, 2000

§ 102(e) Date: Jan. 6, 2000

(87) PCT Pub. No.: WO98/50483

PCT Pub. Date: Nov. 12, 1998

Related U.S. Application Data

(60) Provisional application No. 60/046,120, filed on May 9, 1997.

(51) Int. Cl.[7] .................................................... H01B 3/22
(52) U.S. Cl. .................................. 585/6.3; 585/1; 252/73; 252/570
(58) Field of Search .................... 585/1, 6.3; 252/570, 252/73

(56) References Cited

U.S. PATENT DOCUMENTS 5,017,733 * 5/1991 Sato et al. ............................. 585/6.3

OTHER PUBLICATIONS

Benjamin, Ben M. et al., Thermal cleavage of chemical bonds in selected coal–related structures, Fuel, 1978, vol. 57, May, pp. 269–272.

Commandeur, R. et al., A New Family of High Performance Thermal Fluids, Informations Chimie, vol. 33, No. 376, 1996–03, pp. 93–96 (translation).

Galasso, P.J. et al., Syntrel 350 Un nuovo fluido diatermico sintetico per alte prestazioni, Pitture Vernici, 1986, vol. 62, 10, pp. 103–107 —English language sections. (Considered only English Summary).

Matsumoto, Tadashi et al., Thermal; Transfer Fluid: 1–Phenyl–1–tetrahydronaphthylethane, Ind. Eng. Chem., Prod. Res. Dev., Vol. 15, No. 3, 1976, presented at the Division of Industrial and Engineering Chemistry, Centennial Meeting of the American Chemical Society, New York, N.Y., Apr. 1976, pp. 215–218.

Syntrel 350 heat transfer fluid, Exxon Chemicals, May 1988.

* cited by examiner

Primary Examiner—Elizabeth D. Wood
(74) Attorney, Agent, or Firm—Dale H. Schultz

(57) ABSTRACT

A high temperature heat transfer fluid is disclosed which comprises a mixture of 1,2,3,4-tetrahydro(1-phenylethyl) naphthalene and dibenzyl toluene to provide high temperature heat transfer fluids exhibiting favorable thermal stability.

6 Claims, 2 Drawing Sheets

Fluid Degradation at 650 F

Fluid Degradation at 675 F

THERMAL FLUID BLENDS CONTAINING 1, 2,3,4-TETRAHYDRO(1-PHENYLETHYL) NAPHTHALENE

This application claims the benefit of U.S. Provisional Application Ser. No. 60/046,120, filed May 9, 1997.

This invention relates to high temperature heat transfer fluids, and more particularly to heat transfer fluids comprising blends of 1,2,3,4-tetrahydro(1-phenylethyl)-naphthalene with other fluids, especially dibenzyl toluene.

Thermal fluids or heat transfer fluids are widely used, for example, to control processing temperatures in chemical plants. The ability of a fluid to resist degradation at elevated temperatures is called thermal stability. Typically, as a heat transfer fluid degrades, volatile, light boiling materials as well as other heavier components are formed. These heavy components increase the fluid's viscosity leading to an increase in film temperature, which results in higher degradation. Further, polymers formed through the degradation of the fluids tend to darken the fluid and ultimately deposit on surfaces in the system thereby decreasing the system efficiency and potentially leading to more serious system failure. Thus, significantly degraded fluid must be replaced with fresh fluid, or it must be periodically recycled.

The long-standing importance of findings fluids exhibiting improved thermal stability is evidenced, for example, by Matsumoto et al., Ind. Eng. Chem., Prod. Res. Dev., Vol. 15, no. 3, 1976, p. 215–218, which is herein incorporated by reference. Matsumoto tested the thermal stability of 1-phenyl-1-tetrahydronaphthylethane (PTE, also called 1,2, 3,4-tetrahydro(1-phenylethyl)naphthalene which is abbreviated as ST-THN) and compared the results with thermal fluids such as dibenzyl benzenes and partially hydrogenated terphenyls which are well-established fluids in the industry. Matsumoto's results showed ST-THN to have favorable properties for a high boiling point thermal fluid. Matsumoto also identified the degradation products from ST-THN. Although ST-THN was found to have favorable properties alone, its compatibility with other fluids was not investigated.

In industrial applications, the ability to mix different thermal fluids without the detrimental effects described above can be advantageous. Therefore, a cost effective heat transfer fluid blend having favorable thermal stability properties would be desirable.

This invention is a heat transfer fluid which comprises a mixture of 1,2,3,4-tetrahydro(1-phenylethyl)naphthalene (ST-THN) and dibenzyl toluene as the second fluid. It has been discovered, surprisingly, that mixing ST-THN with specific second fluids significantly improves the thermal stability of the second fluid, better than the weight average of the two fluids. The resulting fluid mixture had thermal stability comparable to the thermal stability of ST-THN alone.

The heat transfer fluid can be beneficially admixed from 1,2,3,4-tetrahydro(1-phenylethyl)naphthalene; and a second fluid characterized as an aromatic component having alkyl, cyclohexyl, or cyclopentyl linkages; preferably, alkyl linkages. The second fluid is preferably other than a degradation product of 1,2,3,4-tetrahydro(1-phenylethyl)naphthalene.

More specifically, the heat transfer fluid can be admixed from: 1,2,3,4-tetrahydro(1-phenylethyl)naphthalene; and a second fluid selected from the group consisting of dibenzyl toluene, partially hydrogenated terphenyl, dibenzyl benzene, xylyl toluene, dixylyl toluene, xylyl xylene, dixylyl xylene, diethylbenzene, 1,1-diphenylethane, benzene alkylates, alkylnaphthalenes, alkylbiphenyls, diphenylmethane, cyclohexyldiphenyl ether, alkyldiphenylethers, triphenylmethane, tritolylmethane, and mixtures thereof.

Another embodiment of the present invention is a method for preparing the heat transfer fluid. The method comprises admixing 1,2,3,4-tetrahydro(1-phenylethyl)-naphthalene with a second fluid as described above. The 1,2,3,4-tetrahydro(1-phenylethyl)naphthalene component preferably constitutes at least twenty-five percent by weight of the total heat transfer fluid.

A further embodiment of the present invention is a method of controlling the temperature of a system. The method comprises adding to the system 1,2,3,4-tetrahydro (1-phenylethyl)naphthalene and a second fluid as described above. The 1,2,3,4-tetrahydro(1-phenylethyl)-naphthalene and the second fluid may be added to the system separately or admixed together prior to addition to the system.

Figure 1A:
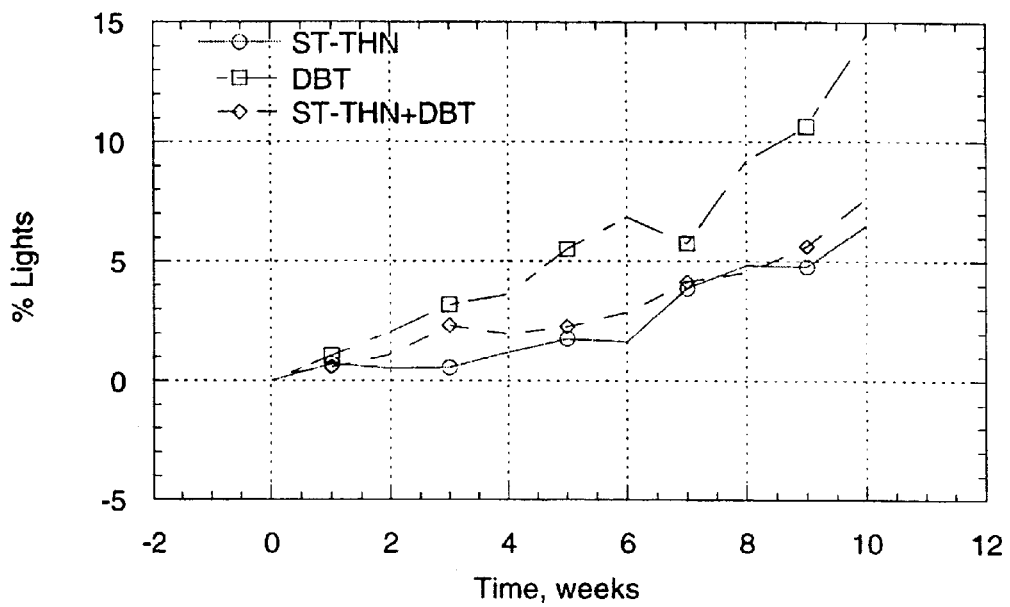
FIGS. 1A and 1B show fluid degradation of a mixture of 1,2,3,4-tetrahydro(1-phenylethyl)naphthalene (ST-THN) and dibenzyl toluene (DBT) compared to the fluid degradation of each component alone when tested at 650° F. (343° C.) and at 675° F. (375° C.).

One embodiment of the present invention is a heat transfer fluid comprising 1,2,3,4-tetrahydro(1-phenylethyl)-naphthalene and a second fluid of dibenzyl toluene.

1,2,3,4-tetrahydro(1-phenylethyl)naphthalene is also called styrenated tetrahydronaphthalene (ST-THN), or 1-phenyl-1-tetrahydronaphthylehane (PTE), and is an isomeric mixture of 1,2,3,4-tetrahydro-5-(1-phenylethyl) naphthalene and 1,2,3,4-tetrahydro-6-(1-phenylethyl) naphthalene. ST-THN may be prepared by reaction of tetralin with styrene as described, for example, in Matsumoto et al., Ind. Eng. Chem., Prod. Res. Dev., Vol. 15, no. 3, 1976, pp. 215–216, which is herein incorporated by reference. ST-THN is also commercially available from The Dow Chemical Company as DOWTHERM™ RP heat transfer fluid.

Useful second fluids may be characterized as a fully aromatic component having alkyl, cyclohexyl, or cyclopentyl linkages, with the proviso that the second fluid is other than a degradation product of 1,2,3,4-tetrahydro(1-phenylethyl)naphthalene. Full aromatic components include benzene, biphenyl, and naphthalene structures. Representative alkyl linkages include C1 to C4 linear or branched hydrocarbon moieties.

More specifically, the heat transfer fluid can be admixed from: 1,2,3,4-tetrahydro(1-phenylethyl)naphthalene and dibenzyl toluene ($C_6H_3(C_6H_5CH_2)_2(CH_3)$). Partially hydrogenated terphenyls ($C_6H_4(C_6H_5)(C_6H_{11})$ and $C_6H_4(C_6H_{11})_2$), dibenzyl benzene ($C_6H_4(C_6H_5CH_2)_2$), xylyl toluene ($C_6H_4(C_6H_4(CH_3)CH_2)(CH_3)$), dixylyl toluene ($C_6H_3(C_6H_4(CH_3)CH_2)_2(CH_3)$), xylyl xylene ($C_6H_3(C_6H_4(CH_3)CH_2)(CH_3)_2$), dixylyl xylene ($C_6H_2(C_6H_4(CH_3)CH_2)_2(CH_3)_2$), diethylbenzene (($C_6H_4)(CH_2CH_3)_2$), 1,1-diphenylethane ($CH_3CH(C_6H_5)_2$), benzene alkylates (($C_{6-x}H_6)(R_x)$), alkynaphthalenes ($C_{10}H_7R$), alkylbiphenyls ($R(C_6H_5)_2$), diphenylmethane ($CH_2(C_6H_5)_2$), cyclohexyl-diphenyl ether (($C_6H_5)O(C_6H_4)(C_6H_{11})$), alkyldiphenylethers (($C_6H_5)O(C_6H_4)R$), triphenylmethane (($C_6H_5)_3CH$), tritolylmethane (($C_6H_4(CH_3))_3CH$), and mixtures thereof can also be used with some beneficial effect. In the formulas above, R is a straight or branched alkyl group having 1 to 4 carbon atoms, preferably 1; and x is 1 through 3, preferably 1.

These second fluids are commercially available or can be prepared according to published procedures. For example, the xylene derivative fluids may be prepared as described in Information Chimie, vol. 33, No. 376 (1996) pp. 93–96, which is herein incorporated by reference. Also, cyclohexyldiphenyl ether, alkyldiphenylethers, and tritolylmethane are typically prepared according to conventional alkylation procedures.

Preferably, the second fluid is dibenzyl toluene. Partially hydrogenated terphenyl, diethylbenzene, 1,1-diphenylethane, alkylnaphthalenes, alkylbiphenyls, diphenylmethane, cyclohexyl-diphenyl ether, alkyldiphenylethers, triphenylmethane, tritolylmethane, and mixtures thereof can also be used. Various heat transfer fluids are well-known in the art and many variations of such heat transfer fluids may be useful in combination with the heat transfer fluid of the present invention.

The second fluid can be partially hydrogenated terphenyl. The partially hydrogenated terphenyl may be made of any combination of ortho-, meta-, and para-isomers. Partially hydrogenated terphenyl is commercially available, for example, from The Dow Chemical Company as DOWTHERM™ HT heat transfer fluid. Most preferably, the second fluid comprises isomers of dibenzyl toluene. Dibenzyl toluene is commercially available, for example, from Huls as MARLOTHERM™ SH heat transfer fluid.

Preferably, the 1,2,3,4-tetrahydro(1-phenylethyl)-naphthalene component comprises at least 10 percent by weight of the heat transfer fluid; more preferably, at least 25 percent. At lower concentrations, the thermal stability of the resulting fluid may be less desirable. Preferably, the 1,2,3,4-tetrahydro(1-phenylethyl)naphthalene component comprises less than 90 percent by weight of the heat transfer fluid; more preferably, less than 75 percent. Unless otherwise stated herein, all percentages are given on a weight basis compared to the total weight of the heat transfer fluid.

Another embodiment of the present invention is a method for preparing a heat transfer fluid. The method comprises admixing 1,2,3,4-tetrahydro(1-phenylethyl)naphthalene with a second fluid, wherein the second fluid may be characterized as an aromatic component having alkyl, cyclohexyl, or cyclopentyl linkages. The method of the present invention also comprises admixing 1,2,3,4-tetrahydro(1-phenylethyl)naphthalene with a second fluid consisting of dibenzyl toluene. Partially hydrogenated terphenyl, dibenzyl benzene, xylyl toluene, dixylyl toluene, xylyl xylene, dixylyl xylene, diethylbenzene, 1,1-diphenylethane, benzene alkylates, alkylnaphthalenes, alkylbiphenyls, diphenylmethane, cyclohexyl-diphenyl ether, alkyldiphenylethers, and mixtures thereof can also be beneficially used as the second fluid.

Upon admixing 1,2,3,4-tetrahydro(1-phenylethyl) naphthalene and the second fluid, a homogeneous fluid may be obtained by stirring by any conventional mean, such as pumping and recirculating. Ambient temperature and pressure are suitable mixing conditions.

The preferences described above also apply to this method embodiment, including choice of the second fluid, and weight percent of the ST-THN component. Therefore, a preferred embodiment comprises admixing 1,2,3,4-tetrahydro(1-phenylethyl)naphthalene with dibenzyl toluene. A highly preferred embodiment comprises admixing at least 10 percent 1,2,3,4-tetrahydro(1-phenylethyl) naphthalene by weight with dibenzyl toluene; more preferably, at least 25 percent 1,2,3,4-tetrahydro(1-phenylethyl)naphthalene by weight.

Another embodiment of the present invention is a method of controlling the temperature of a system. The method comprises adding to the system 1,2,3,4-tetrahydro(1-phenylethyl)naphthalene and dibenzyl toluene.

The second fluid may also be characterized as an aromatic component having alkyl, cyclohexyl, or cyclopentyl linkages, with the provisio that the second fluid is other than a degradation product of 1,2,3,4-tetrahydro(1-phenylethyl) naphthalene and may be selected from the group consisting of dibenzyl toluene, partially hydrogenated terphenyl, dibenzyl benzene, xylyl toluene, dixylyl toluene, xylyl xylene, dixylyl xylene, diethylbenzene, 1,1-diphenylethane, benzene alkylates, alkylnaphthalenes, alkylbiphenyls, diphenylmethane, cyclohexyl-diphenyl ether, alkyldiphenylethers, and mixtures thereof. Preferably, the second fluid comprises partially hydrogenated terphenyl; more preferably, the second fluid comprises dibenzyl toluene.

Suitable weight percents are described herein above. Thus, a preferred embodiment comprises adding at least 10 percent 1,2,3,4tetrahydro(1-phenylethyl)-naphthalene by weight and dibenzyl toluene to a system to control system temperature.

In accordance with the method of the present invention, 1,2,3,4-tetrahydro(1-phenylethyl)naphthalene may be admixed with the second fluid prior to addition to the system or ST-THN and the second fluid may be added to the system separately.

The heat transfer fluid blends of the present invention tend to form less heavy components, form less light boiling components, form less carbon deposits in the heat exchange system, and show greater than expected thermal stability over the fluid to which 1,2,3,4-tetrahydro(1-phenylethyl) naphthalene is added. Light boiling components are components having boiling points lower than the original fluid. The 50/50 mixtures tested had boiling points in the range of 360–380° C. (680–716° F.).

EXAMPLES

Preparation of a 50/50 mixture of ST-THN and DBT: A sample comprising a 1:1 weight ratio of ST-THN:dibenzyl toluene was prepared by admixing 550 grams of 1,2,3,4-tetrahydro(1-phenylethyl)naphthalene with 550 grams of dibenzyl toluene in a glass container. The mixture was stirred approximately five minutes at ambient pressure and temperature until a homogeneous fluid was obtained.

Preparation of a 50/50 mixture of ST-THN and HT: A sample comprising a 1:1 weight ratio of ST-THN:partially hydrogenated terphenyl (HT) was prepared in a similar manner by admixing 580 grams of 1,2,3,4-tetrahydro(1-phenylethyl)naphthalene with 580 grams of partially hydrogenated terphenyl.

Both of these fluid samples were subjected to thermal degradation at 650° F. (343° C.) and at 675° F. (357° C.) along with samples of 1,2,3,4-tetrahydro(1-phenylethyl)-naphthalene, dibenzyl toluene, and partially hydrogenated terphenyl by placing 40 milliliters of each fluid in a 16×1 inch (40.64×2.54 cm) carbon steel ampoule which had been evacuated and then purged with nitrogen. The fluid samples were heated in a forced air oven (V Series, from Despatch Industries, Inc.) during the experimental timeframe except for weekly removal for testing. Upon removal from the oven, the ampoules were cooled in dry ice before opening.

The fluid samples were drained into separate containers and heated with heat lamps to complete the recovery of the degraded fluid. The resulting fluids were analyzed by gas chromatography to determine the percent of light boiling components in the fluid as an indication of fluid degradation. The lower the percentage of light boiling components, the less the fluid has degraded, therefore, the greater the thermal stability of the fluid.

Table 1 below shows the results of the degradation tests involving dibenzyl toluene. Samples of 1,2,3,4-tetrahydro (1-phenylethyl)naphthalene (ST-THN), dibenzyl toluene (DBT), and a 50/50 mixture by weight of 1,2,3,4-tetrahydro (1-phenylethyl)naphthalene and dibenzyl toluene were tested at 650° F. (343° C.) for ten weeks and at 675° F. (357° C.) for nine weeks in accordance with the procedures described above.

Figure 1B:
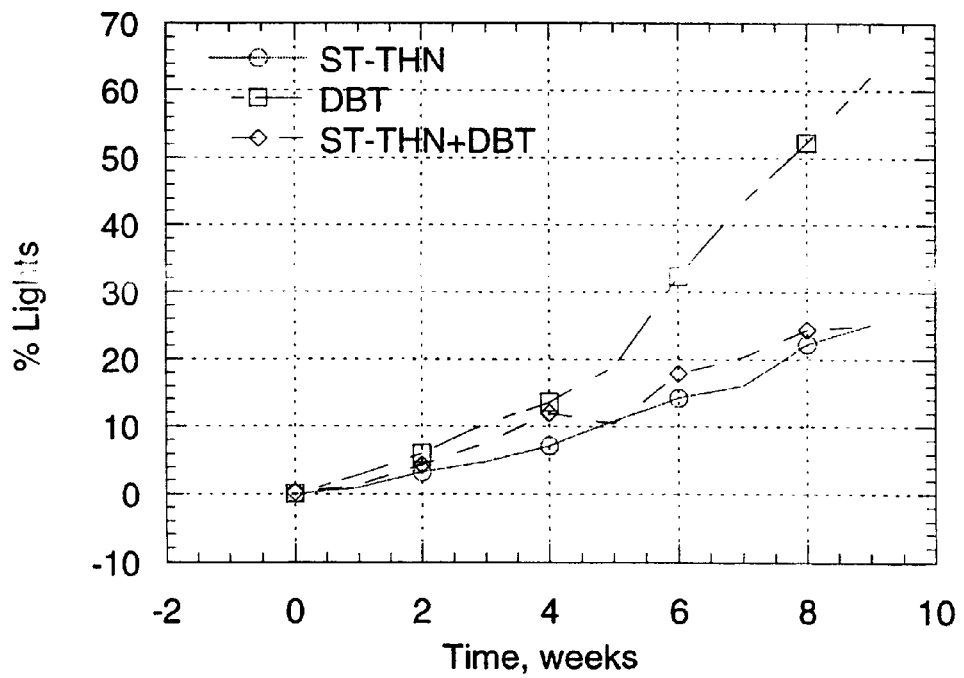

The data are listed in Table 1 and are plotted in FIGS. 1A and 1B. These figures show that DBT degrades significantly faster than either ST-THN alone or the mixture of ST-THN and DBT under the test conditions applied. Surprisingly, the thermal stability of the 50/50 mixture (ST-THN+DBT) closely paralleled that of the ST-THN fluid alone.

TABLE 1

Degradation of Fluids

| Duration (Weeks) | % Lights at 650° F. (343° C.) | | | % Lights at 675° F. (357° C.) | | |
| --- | --- | --- | --- | --- | --- | --- |
| | ST-THN | DBT | ST-THN + DBT 50/50 | ST-THN | DBT | ST-THN + DBT 50/50 |
| 1 | 0.71 | 1.06 | 0.58 | 1.00 | 2.77 | 1.28 |
| 2 | 0.54 | 2.06 | 1.10 | 3.23 | 5.97 | 4.30 |
| 3 | 0.56 | 3.20 | 2.33 | 4.79 | 10.42 | 7.61 |
| 4 | 1.18 | 3.63 | 1.94 | 7.09 | 13.62 | 12.05 |
| 5 | 1.76 | 5.50 | 2.28 | 10.90 | 18.93 | 10.46 |
| 6 | 1.63 | 6.84 | 2.86 | 14.26 | 32.30 | 17.90 |
| 7 | 3.87 | 5.75 | 4.11 | 16.08 | 43.37 | 20.32 |
| 8 | 4.84 | 9.21 | 4.53 | 22.30 | 52.26 | 24.41 |
| 9 | 4.78 | 10.67 | 5.63 | 25.17 | 62.02 | 25.01 |
| 10 | 6.52 | 14.48 | 7.66 | — | — | — |

Figure 2A:
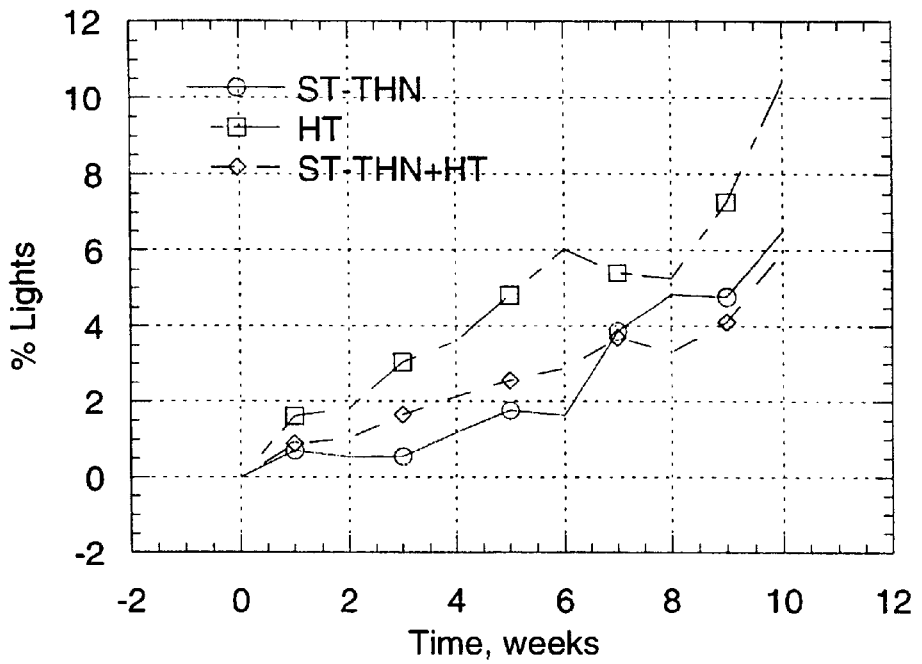
FIGS. 2A and 2B show fluid degradation of a mixture of 1,2,3,4-tetrahydro(1-phenylethyl)naphthalene (ST-THN) and partially hydrogenated terphenyl (HT) compared to the fluid degradation of each component alone when tested at 650° F. (343° C.) and at 675° F. (357° C.).
Figure 2B:
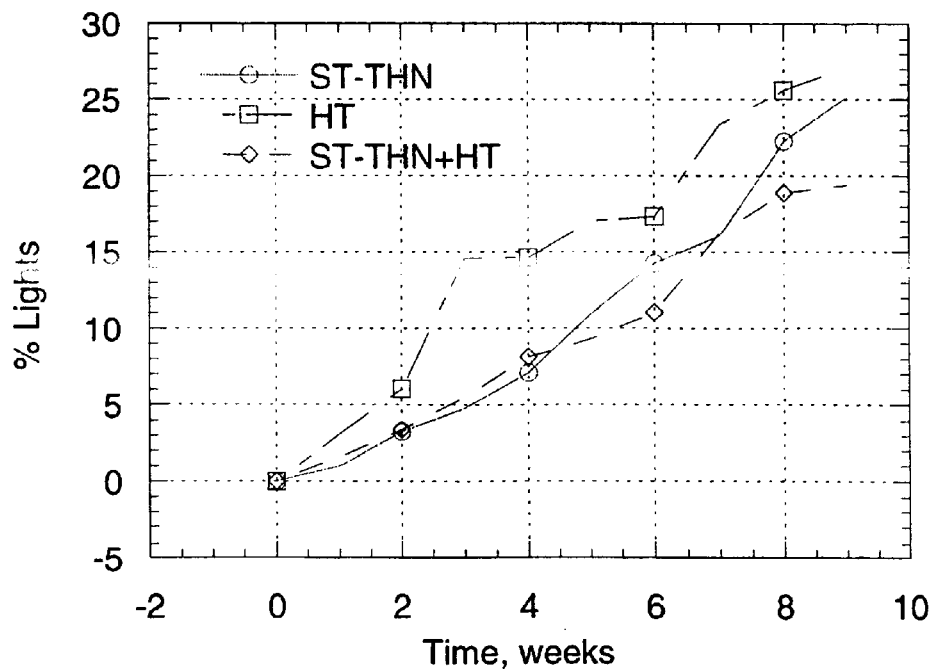

Similar results were obtained for the degradation tests involving partially hydrogenated terphenyl. Samples of ST-THN, HT, and 50/50 mixture by weight percent of ST-THN and HT were tested at 650° F. (343° C.) and at 675° F. (357° C.) for ten weeks. The data are listed in Table 2 below and are plotted in FIGS. 2A and 2B. The 50/50 mixture of ST-THN and partially hydrogenated terphenyl interestingly exhibited thermal stability much closer to that of the superior heat transfer fluid ST-THN, than to the thermal stability of HT.

TABLE 2

Degradation of Fluids

| Duration (Weeks) | % Lights at 650° F. (343° C.) | | | % Lights at 675° F. (357° C.) | | |
| --- | --- | --- | --- | --- | --- | --- |
| | ST-THN | HT | ST-THN + HT 50/50 | ST-THN | HT | ST-THN + HT 50/50 |
| 1 | 0.71 | 1.06 | 0.88 | 1.00 | 3.11 | 1.60 |
| 2 | 0.54 | 1.82 | 1.02 | 3.23 | 6.02 | 3.38 |
| 3 | 0.56 | 3.05 | 1.65 | 4.79 | 14.61 | 5.50 |

TABLE 2-continued

Degradation of Fluids

| Duration (Weeks) | % Lights at 650° F. (343° C.) | | | % Lights at 675° F. (357° C.) | | |
|---|---|---|---|---|---|---|
| | ST-THN | HT | ST-THN + HT 50/50 | ST-THN | HT | ST-THN + HT 50/50 |
| 4 | 1.18 | 3.61 | 2.13 | 7.09 | 14.66 | 8.12 |
| 5 | 1.76 | 4.81 | 2.57 | 10.90 | 17.03 | 9.32 |
| 6 | 1.63 | 6.02 | 2.88 | 14.26 | 17.35 | 11.05 |
| 7 | 3.87 | 5.42 | 3.70 | 16.08 | 23.40 | 16.27 |
| 8 | 4.84 | 5.26 | 3.31 | 22.30 | 25.65 | 18.87 |
| 9 | 4.78 | 7.28 | 4.11 | 25.17 | 27.08 | 19.39 |
| 10 | 6.52 | 10.42 | 6.00 | 27.10 | 32.60 | 20.34 |

What is claimed is:

1. A heat transfer fluid comprising:
   a) 1,2,3,4-tetrahydro(1-phenylethyl)naphthalene; and
   b) dibenzyl toluene.

2. The heat transfer fluid of claim 1 wherein 1,2,3,4-tetrahydro(1-phenylethyl)naphthalene comprises at least 10 percent by weight of the heat transfer fluid.

3. The heat transfer fluid of claim 1 wherein 1,2,3,4-tetrahydro(1-phenylethyl)naphthalene comprises at least 25 percent by weight of the heat transfer fluid.

4. A method of preparing a heat transfer fluid, the method comprising admixing 1,2,3,4-tetrahydro(1-phenylethyl)naphthalene with dibenzyl toluene.

5. The method of claim 4 wherein 1,2,3,4-tetrahydro(1-phenylethyl)naphthalene comprises at least 10 percent by weight of the heat transfer fluid.

6. The method of claim 5 wherein 1,2,3,4-tetrahydro(1-phenylethyl)naphthalene comprises at least 25 percent by weight of the heat transfer fluid.

* * * * *